(12) United States Patent
Yamamoto et al.

(10) Patent No.: US 10,787,001 B2
(45) Date of Patent: Sep. 29, 2020

(54) IMAGE FORMING APPARATUS

(71) Applicant: Konica Minolta, Inc., Chiyoda-ku, Tokyo (JP)

(72) Inventors: Yutaka Yamamoto, Shinshiro (JP); Tatsuya Eguchi, Toyohashi (JP); Shigetaka Kato, Shinshiro (JP); Taku Kimura, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/295,081

(22) Filed: Mar. 7, 2019

(65) Prior Publication Data

US 2019/0308420 A1 Oct. 10, 2019

(30) Foreign Application Priority Data

Apr. 10, 2018 (JP) .................. 2018-075173

(51) Int. Cl.
*B41J 2/47* (2006.01)
*G02B 26/12* (2006.01)

(52) U.S. Cl.
CPC ............ *B41J 2/471* (2013.01); *G02B 26/122* (2013.01); *G02B 26/125* (2013.01)

(58) Field of Classification Search
CPC ...... B41J 2/471; G02B 26/125; G02B 26/122; H04N 2201/0094; H04N 2201/04755; H04N 1/23; H04N 1/2307; H04N 1/113; G03G 15/04036; G03G 15/043; G03G 21/00; G03G 13/00
USPC ......................................................... 347/261
See application file for complete search history.

(56) References Cited

U.S. PATENT DOCUMENTS

2018/0150013 A1* 5/2018 Nii ..................... G03G 15/5037

FOREIGN PATENT DOCUMENTS

| JP | H08258330 | A | 10/1996 | |
| JP | 2007245448 | A | 9/2007 | |
| JP | 2010145849 | | * 12/2008 | ............ G02B 26/10 |
| JP | 2011178037 | A | 9/2011 | |
| JP | 2016045405 | A | 4/2016 | |

* cited by examiner

*Primary Examiner* — Huan H Tran
*Assistant Examiner* — Alexander D Shenderov
(74) *Attorney, Agent, or Firm* — Buchanan Ingersoll & Rooney PC

(57) ABSTRACT

An image forming apparatus including a polygon mirror that deflects a light beam, the image forming apparatus includes: an optical sensor arranged such that the light beam deflected by the polygon mirror enters the optical sensor; and a hardware processor that measures an output level of the optical sensor and calculates, as a remaining life of the polygon mirror, an operation time of the polygon mirror to when the output level becomes a threshold value in a case of assuming that the output level ongoingly changes at a rate of change over time that is a change amount of the output level per unit operation time of the polygon mirror, using the measured output level.

13 Claims, 18 Drawing Sheets

170

| OPERATION TIME ΔT [h] FROM PREVIOUS DETERMINATION | TO 100 | TO 200 | TO 300 | TO 400 | TO 500 | TO 600 | TO 700 | TO 800 | TO 900 |
|---|---|---|---|---|---|---|---|---|---|
| RATE OF CHANGE OVER TIME Da | −0.18 | −0.16 | −0.14 | −0.12 | −0.10 | −0.08 | −0.06 | −0.04 | −0.02 |

| ROTATION SPEED V [rpm] | CORRECTION EFFICIENT α | OPERATION TIME ΔT [h] | CORRECTED OPERATION TIME ΔTa [h] |
|---|---|---|---|
| 25000 | 1.2 | 200 | 240 |
| 30000 | 1.0 | 500 | 500 |
| 35000 | 0.5 | 300 | 150 |

IMAGE FORMING APPARATUS

The entire disclosure of Japanese patent Application No. 2018-075173, filed on Apr. 10, 2018, is incorporated herein by reference in its entirety.

BACKGROUND

Technological Field

The present invention relates to an image forming apparatus.

Description of the Related Art

An electrophotographic image forming apparatus performs light irradiation (pattern exposure) according to image data while rotating a cylindrical photoreceptor and charging a peripheral surface, thereby partly erasing a charge on the peripheral surface to form a latent image (electrostatic latent image).

As a method of the pattern exposure, a method of deflecting a laser beam in a direction of a rotation axis of the photoreceptor by a polygon mirror and performing line sequential main scanning is widely used. In this method, to align heads of lines of an image, an optical sensor is arranged at an appropriate position in an optical path of the laser beam, and the main scanning is started with reference to timing when the laser beam enters the optical sensor.

An environment where the image forming apparatus is used is not only an office environment. The image forming apparatus is sometimes used in an environment where the amount of dust is relatively large, like a factory or an event venue. The image forming apparatus is sometimes used in an environment where the humidity is constantly high.

When dust enters the image forming apparatus and adheres to the polygon mirror, that is, when a mirror surface gets dirty, the light amount of the laser beam reflected by the polygon mirror and entering the photoreceptor decreases. Particularly, in a high-speed machine rotating a polygon mirror at a high speed, entrainment dirt in which dust is caught in an air current due to rotation, and adheres to the polygon mirror, tends to progress.

As conventional technologies for detecting the degree of dirt of a polygon mirror, there are technologies described in JP 8-258330 A and JP 2007-245448 A.

JP 8-258330 A discloses detecting a peak value of light intensity of laser light entering an optical sensor provided for synchronizing main scanning, using a peak hold circuit, and obtaining a difference value between the detected peak value and a peak value detected and stored at initial shipping adjustment. Then, an image forming apparatus described in JP 8-258330 A displays a warning message requesting maintenance of an optical system in a case where the difference value is a predetermined value or more, that is, in a case where the current peak value becomes a predetermined value or less.

JP 2007-245448 A discloses measuring a pulse width of a synchronization detection signal obtained by an optical sensor provided for synchronizing main scanning by counting a clock, and comparing the measured pulse width with a pulse width at initial setting to estimate a variation amount of a light amount. Then, an image forming apparatus described in JP 2007-245448 A displays and notifies abnormal content such as dirt on the polygon mirror to the user in a case where the variation amount of the light amount exceeds a predetermined value. Alternatively, the image forming apparatus controls a laser light source such that the light amount coincides with the light amount at the initial setting according to the variation amount of the light amount.

Regarding determination of deterioration of a light source itself, there are technologies described in JP 2016-45405 A and JP 2011-178037 A. JP 2016-45405 A discloses determining that there is a tendency of deterioration when a cumulative lighting time of the light source reaches a predetermined value, or when a current to be supplied to the light source in order to make an output light amount be a predetermined value is increased by a set value. JP 2011-178037 A discloses determining that abnormality has occurred in the light source when an output voltage of a photodiode for monitoring an output light amount of the light source falls outside a set range.

According to the technologies in JP 8-258330 A and JP 2007-245448 A, the dirt on the polygon mirror can be determined to have progressed to a state close to out of use. However, there has been a problem that how much longer the polygon mirror can be used until the out of use cannot be determined. Even if the dirt progresses to the state close to out of use, the polygon mirror may become out of use within a short period after the progress or may be able to be continuously used for a certain long period. Which of the cases will occur depends on the speed of progress of dirt. The speed of progress of dirt depends on a use environment and a use state of the image forming apparatus.

Only the notification of the state of the polygon mirror close to out of use to the user as in JP 8-258330 A and JP 2007-245448 A may cause a situation where the polygon mirror is replaced at an early stage although early replacement is not required, or the polygon mirror is not replaced and becomes out of use although early replacement is required, which panics the user.

SUMMARY

The present invention has been made in view of the above problems, and an object of the present invention is to provide an image forming apparatus that predicts a remaining time to when a polygon mirror becomes out of use due to dirt.

To achieve the abovementioned object, according to an aspect of the present invention, an image forming apparatus including a polygon mirror that deflects a light beam reflecting one aspect of the present invention comprises: an optical sensor arranged such that the light beam deflected by the polygon mirror enters the optical sensor; and a hardware processor that measures an output level of the optical sensor and calculates, as a remaining life of the polygon mirror, an operation time of the polygon mirror to when the output level becomes a threshold value in a case of assuming that the output level ongoingly changes at a rate of change over time that is a change amount of the output level per unit operation time of the polygon mirror, using the measured output level.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 16A and 16B are diagrams illustrating an example of a rate of change correction table and an example of a relationship between presence or absence of correction and a remaining life.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
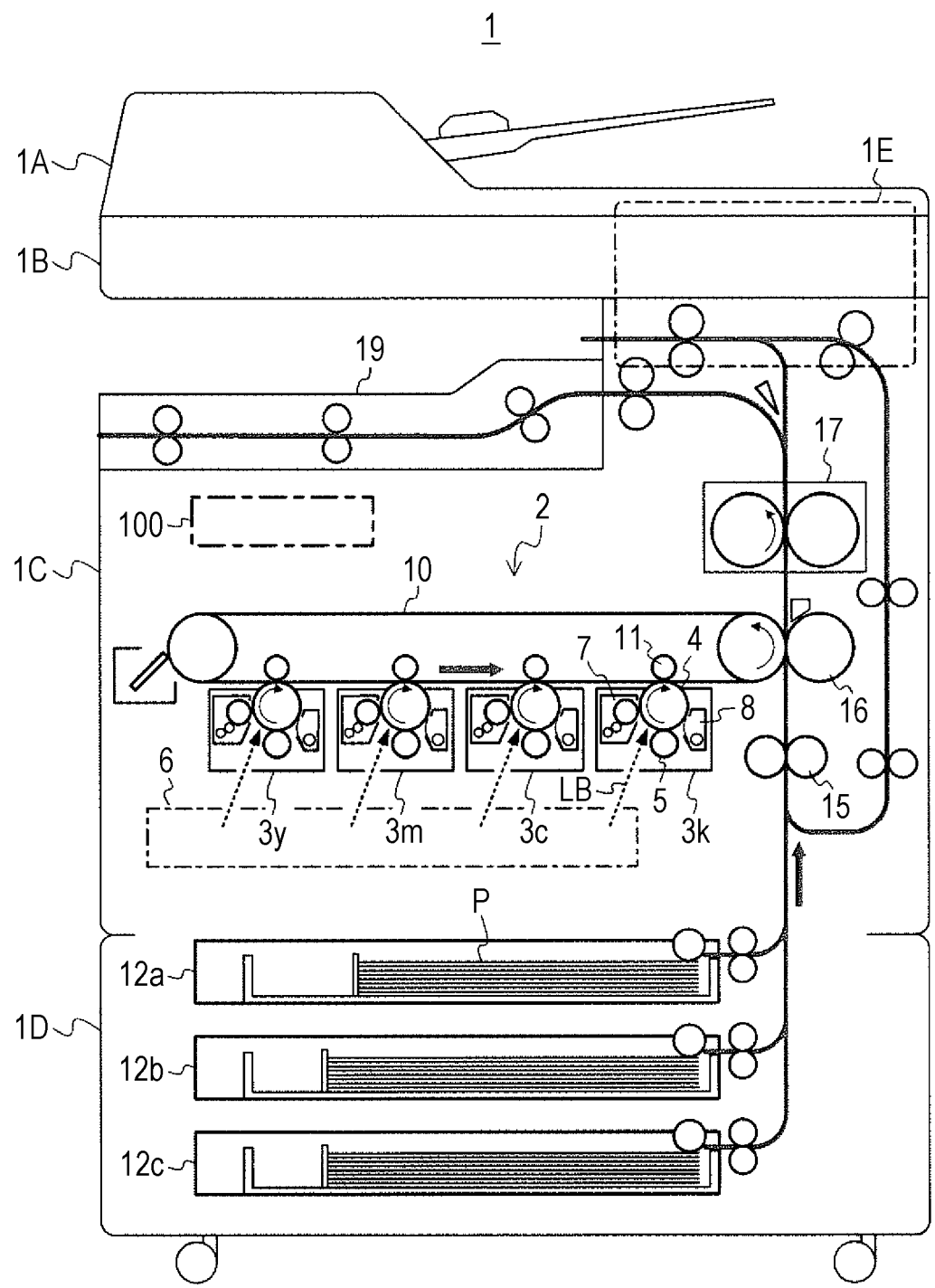
FIG. 1 is a diagram illustrating an outline of a configuration of an image forming apparatus according to an embodiment of the present invention.

FIG. 1 illustrates an outline of a configuration of an image forming apparatus 1 according to an embodiment of the present invention. The image forming apparatus 1 is a multi-functional peripheral (MFP) (a multifunctional machine or a complex machine) in which functions of a copying machine, a printer, a facsimile machine, an image reader, and the like are put together.

The image forming apparatus 1 includes an auto document feeder (ADF) 1A, a flat bed scanner 1B, an electrophotographic color printer 1C, a sheet cabinet 1D, an operation panel 1E, and the like.

The auto document feeder 1A conveys a document (sheet) set on the document tray to a reading position of the scanner 1B. The scanner 1B reads an image from a sheet-like document conveyed from the auto document feeder 1A or from various documents set on a platen glass to generate image data.

The color printer 1C forms a color or monochrome image on one side or both sides of a recording sheet (paper) P in a print job such as copy, network printing (PC print), facsimile reception, box print, or the like. For example, in a copy job, the color printer 1C forms an image on the basis of image data generated by the scanner 1B.

The color printer 1C includes a tandem printer engine 2. The printer engine 2 includes four imaging units 3y, 3m, 3c, and 3k, a print head 6, an intermediate transfer belt 10, and the like.

Each of the imaging units 3y to 3k includes a cylindrical photoreceptor 4, a charging roller 5, a developer 7, a cleaner 8, and the like. Basic configurations of the imaging units 3y to 3k are similar.

The print head 6 emits a laser beam LB as light for pattern exposure to each of the imaging units 3y to 3k. Main scanning in which the laser beam LB is deflected in a direction parallel to a rotation axis of the photoreceptor 4 is performed in the print head 6. A sub scanning in which the photoreceptor 4 is rotated at a constant speed is performed in parallel to the main scanning.

The intermediate transfer belt 10 is a member to be transferred at primary transfer of a toner image and is wound between a pair of rollers and rotated. A primary transfer roller 11 is arranged for each of the imaging units 3y, 3m, 3c, and 3k inside the intermediate transfer belt 10.

The sheet cabinet 1D is a drawer cabinet having a three-stage configuration including sheet feed trays 12a, 12b, and 12c. The sheet cabinet 1D takes out a sheet P from one of the sheet feed trays selected according to job specification and supplies the sheet P to the color printer 1C above the sheet cabinet 1D.

The operation panel 1E includes a touch panel display that displays a screen for an operation by a user, and outputs a signal corresponding to an input operation. The operation of the image forming apparatus 1 is controlled by a control circuit 100 according to the signal.

In color printing mode, the imaging units 3y to 3k form toner images of four colors of yellow (Y), magenta (M), cyan (C), and black (K) in parallel. The four-color toner images are sequentially primarily transferred to the intermediate transfer belt 10 during rotation. First, the Y toner image is transferred, and the M toner image, the C toner image, and the K toner image are sequentially transferred to overlap with the Y toner image.

When the primarily transferred toner images face a secondary transfer roller 16, the toner images are secondarily transferred to the sheet P conveyed from the sheet cabinet 1D via a timing roller 15. After the secondary transfer, the sheet P passes through a fixer 17 and a communication conveying path 19 in order, and is sent out to a finisher. In a case where the finisher is not coupled to the image forming apparatus 1, the sheet P is discharged to a sheet discharge tray 19 in place of the communication conveying path 19. When the paper P passes through the fixer 17, the toner images are fixed to the paper P by heating and pressing.

Figure 2A:
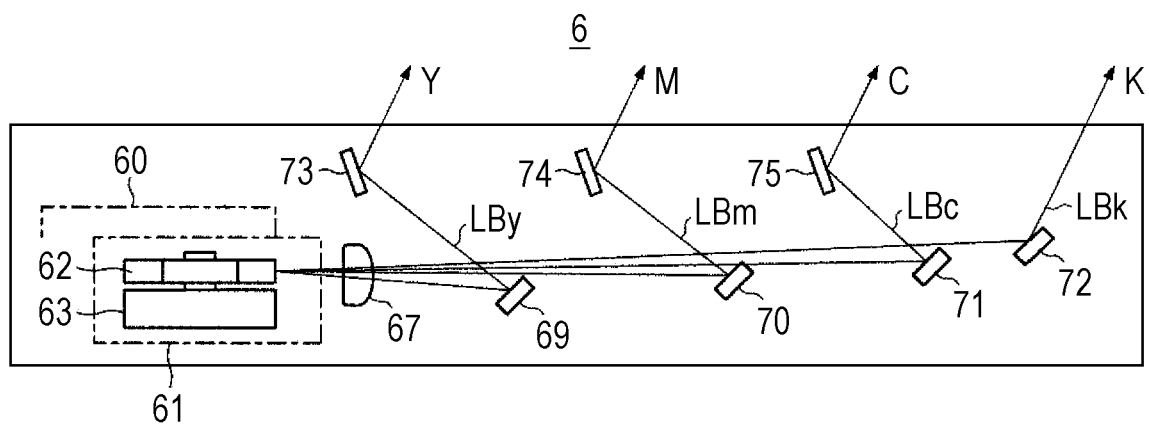
FIGS. 2A and 2B are diagrams illustrating a configuration of a print head.
Figure 2B:
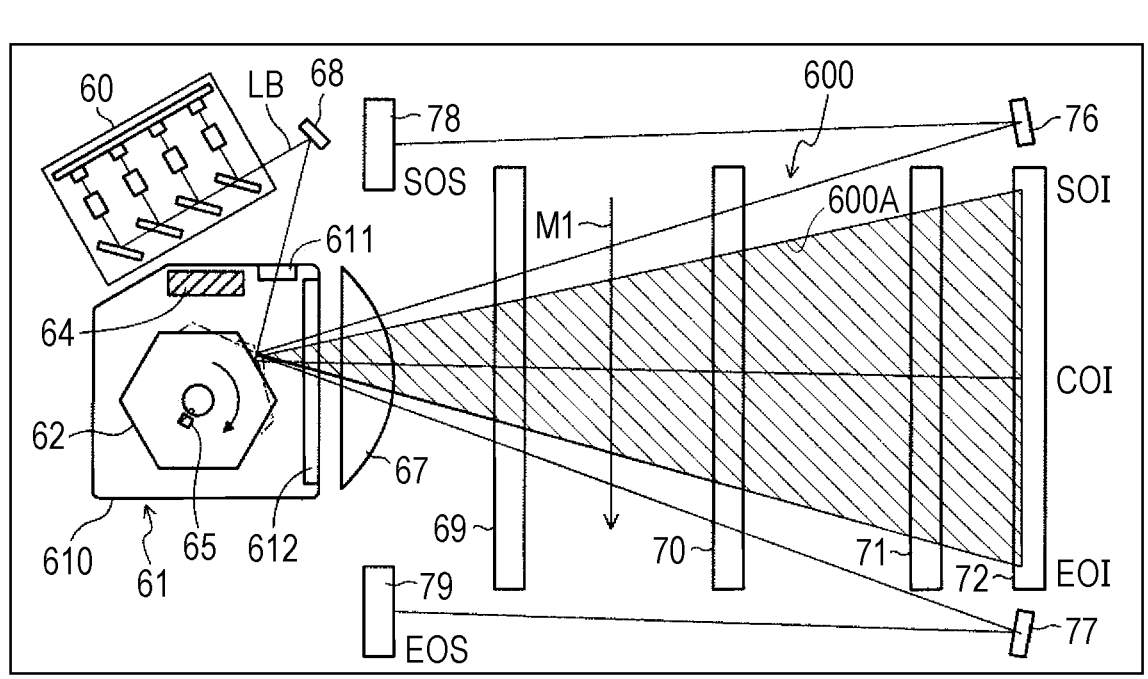
Figure 3:
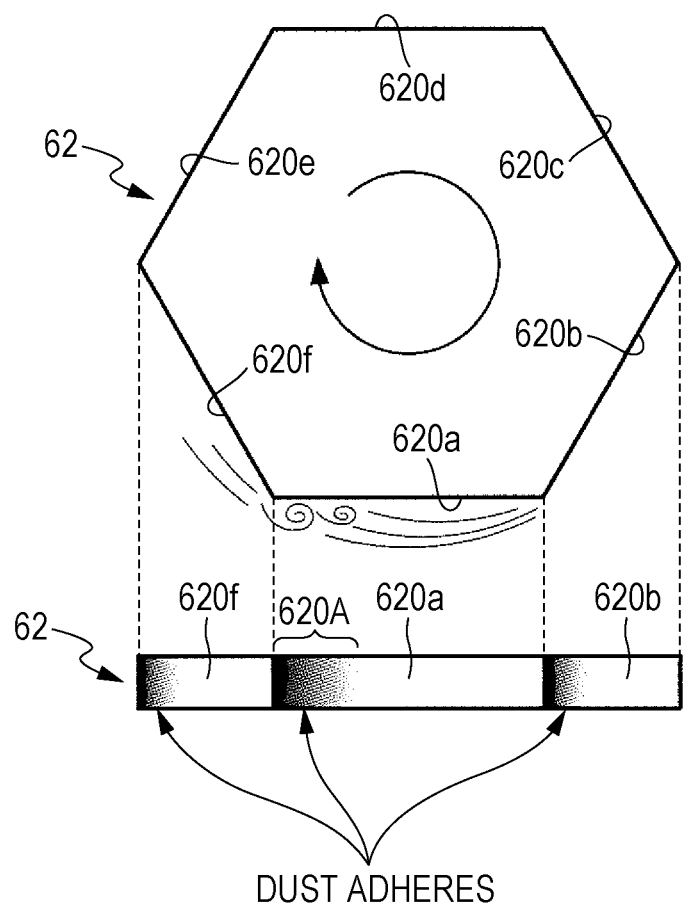
FIG. 3 is a diagram illustrating a tendency of how a polygon mirror gets dirty.
Figure 4A:
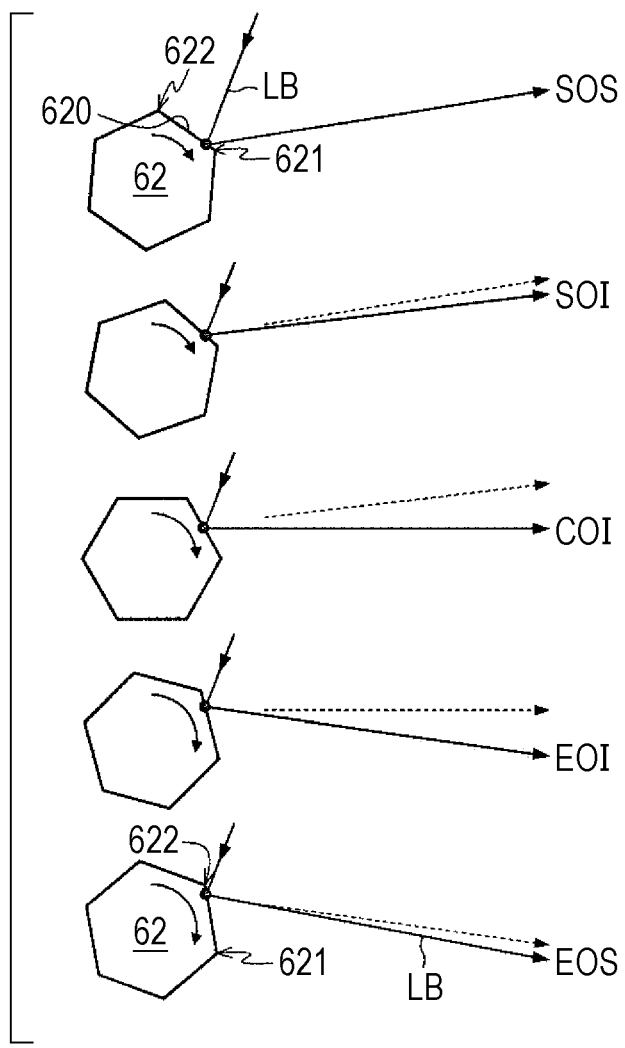
FIGS. 4A and 4B are diagrams illustrating a relationship between a rotation angle of the polygon mirror and a light amount of a laser beam.
Figure 4B:
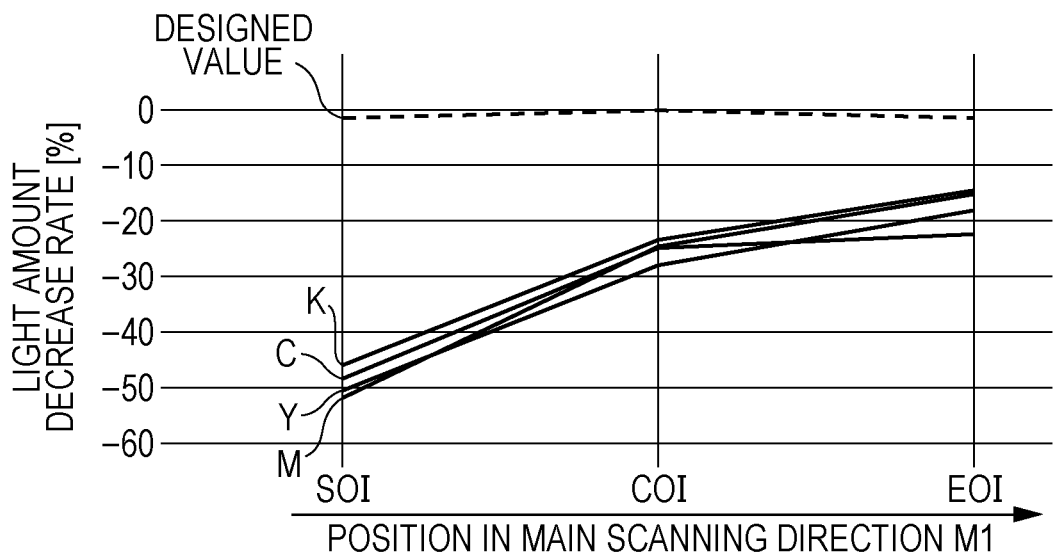

FIGS. 2A and 2B illustrate the configuration of the print head 6. Specifically, FIG. 2A illustrates the configuration viewed from a front side, and FIG. 2B illustrates the configuration viewed from above. Further, FIG. 3 illustrates a tendency of how a polygon mirror 62 gets dirty, and FIGS. 4A and 4B illustrate a relationship between a rotation angle of the polygon mirror 62 and a light amount of the laser beam LB, respectively.

As illustrated in FIGS. 2A and 2B, the print head 6 includes a light source unit 60, a polygon unit 61, an fθ lens 67, reflection mirrors 68 to 77, and two optical sensors 78 and 79.

The light source unit 60 is means that emits the laser beam LB for exposure according to a latent image to each of the four photoreceptors 4 provided one by one to each of the imaging units 3*y* to 3*k*. In the light source unit 60, a set of a laser light source, a collimator lens, and a mirror is provided to each of the imaging units 3*y* to 3*k*. The laser light source is, for example, a semiconductor laser (laser diode) provided with a light emission monitoring photodiode. The four laser beams LB collimated by the collimator lens are reflected by the mirrors and travel in substantially the same direction. The four mirrors are arranged in a staggered manner so as not to shield the laser beam LB reflected by another mirror or are half mirrors.

In color printing, a total of four laser beams LBy, LBm, LBc, and LBk corresponding to the Y, M, C, and K respective colors are emitted from the light source unit 60. The emitted laser beam LB is guided to the polygon unit 61 by the reflection mirror 68.

The polygon unit 61 is an optical device in which the polygon mirror 62 and a polygon motor 63 that rotationally drives the polygon mirror 62 are accommodated and integrated in a housing 610. Glass windows 611 and 612 through which the laser beam LB is transmitted are provided in the housing 610. In the present embodiment, the polygon unit 61 includes a dust sensor 64 that detects a dust concentration of an inside of the housing 610, and a position sensor 65 that detects that a rotation angle position of the polygon mirror 62 has reached a reference position. Use of these sensors will be described below.

The laser beam LB guided by the reflection mirror 68 is transmitted through the glass window 611 and enters the polygon mirror 62. The polygon mirror 62 rotates at a high speed in one direction by the polygon motor 63 to deflect the laser beam LB in a main scanning direction M1. The deflected laser beam LB is transmitted through the glass window 612 and proceeds to the fθ lens 67.

The fθ lens 67 corrects a traveling direction of the incident laser beam LB so that the laser beam LB performs main scanning at a uniform speed on the photoreceptor 4. The laser beam LB having passed through the fθ lens 67 is guided to the photoreceptor 4 of each of the imaging units 3*y* to 3*k* by the reflection mirrors 69 to 75 and radiates a surface of the photoreceptor 4.

Further, the laser beam LB is guided to the optical sensors 78 and 79 by the reflection mirrors 76 and 77 arranged outside a main optical path (shaded in FIG. 2B) 600A corresponding to a forming region of the latent image, of an optical path 600 that the laser beam LB passes through after deflection.

The reflection mirror 76 is arranged near an upstream-side end in the reflection mirror 72 in the main scanning direction M1, for example. Therefore, the laser beam LB having passed through an upstream-side portion of the optical path 600 in the main scanning direction M1 (deflecting direction) enters the optical sensor 78. A light detection signal by the optical sensor 78 is used as a start of scan (SOS) signal for synchronizing start of main scanning of lines.

Further, the reflection mirror 77 is arranged near a downstream-side end in the reflection mirror 72 in the main scanning direction M1. Therefore, the laser beam LB having passed through a downstream-side portion of the optical path 600 in the main scanning direction M1 enters the optical sensor 79. A light detection signal by the optical sensor 79 is used as an end of scan (EOS) signal for synchronizing termination of main scanning of lines.

As illustrated in FIG. 3, the polygon mirror 62 has, for example, a regular hexagonal prism shape with a low outer shape in height, and has six mirror surfaces 620 (620*a* to 620*f*) constituting side surfaces of a hexagonal prism. Each mirror surface 620 has a strip shape having a length corresponding to one side of a regular hexagon. The polygon mirror 62 rotates at a predetermined speed so as to deflect one line of the main scanning by one mirror surface 620 with a geometric center of a regular polygon as a rotation center.

Note that the shape in planar view of the polygon mirror 62 may be a regular heptagon or another regular polygon.

An air current is generated as the polygon mirror 62 rotates at a high speed. The air current causes dust floating inside and outside the image forming apparatus 1 to enter the inside of the polygon unit 61 through fine gaps in the print head 6.

Since the side surface of the polygon mirror 62 is angular, a vortex of the air current is generated near a side surface rotating at a high speed. In particular, the vortex is more likely to be generated at a front end side on each mirror surface 620 in a rotating direction, and the vortex generated at the front end side moves with the rotation of the mirror surface 620 as if dragged on the mirror surface 620. That is, the polygon mirror 62 rotates while constantly generating the vortex near a front end-side portion 620A on the mirror surface 620.

This vortex rolls up the dust floating around the polygon mirror 62 and causes the dust to adhere to the mirror surface 620. Therefore, more dust adheres to the front end side than to a rear end side of the mirror surface 620. That is, the front end side of each mirror surface 620 is more likely to get dirty with the dust than the rear end side.

As illustrated in FIG. 4A, the position (illustrated by the black circle in FIG. 4A) that the laser beam LB enters on the mirror surface 620 in the main scanning of one line moves with the rotation of the polygon mirror 62.

That is, when deflecting the laser beam LB in a direction of generating the SOS signal, the laser beam LB enters a vicinity of a front end 621 of the mirror surface 620 in the rotating direction. Thereafter, the incident position becomes more distant from the front end 621 as the deflection advances in a direction toward a position (start of image (SOI)) where exposure for image formation is started, in a direction toward the center of an image (center of image (COI)), and in a direction toward a position (end of image (EOM where the exposure is terminated. When deflecting the laser beam LB in a direction of generating the EOS signal, the laser beam LB enters a vicinity of a rear end 622 of the mirror surface 620 in the rotating direction.

Change over time of the polygon mirror 62 includes a decrease in the light amount of the laser beam LB due to the dirt on the mirror surface 620. Since the dirt on the mirror surface 620 rapidly advances on the front end side, as described above, a light amount decrease rate on an upstream side in the main scanning direction M1 becomes larger than a light amount decrease rate on a downstream side in the main scanning direction M1, as illustrated in FIG. 4B. This tendency is similarly observed in the Y, M, C, and K laser beams LBy, LBm, LBc, and LBk.

When the light amount of the laser beam LB is excessively lowered, the SOS signal cannot be obtained and an image cannot be formed. Also, the image quality remarkably deteriorates as a difference in the light amount between the upstream side and the downstream side in the main scanning direction M1 becomes large. That is, unevenness in density and unevenness in gradation reproduction due to nonuniformity of the exposure amount in the main scanning direction M1 become conspicuous.

Therefore, the polygon mirror 62 with the polygon unit 61 as a whole needs to be replaced with a new one before the dirt on the mirror surface 620 of the polygon mirror 62 exceeds an upper limit of an allowable range, that is, before the lifetime of the polygon mirror 62 ends.

Therefore, the image forming apparatus 1 is provided with a lifetime prediction function to quantify the remaining life (an operable remaining time) of the polygon mirror 62. The remaining life serves as a guide when the user or a service person decides whether to replace the polygon mirror 62. Hereinafter, the configuration and operation of the image forming apparatus 1 will be described focusing on the lifetime prediction function.

[First Mode of Lifetime Prediction]

Figure 5:
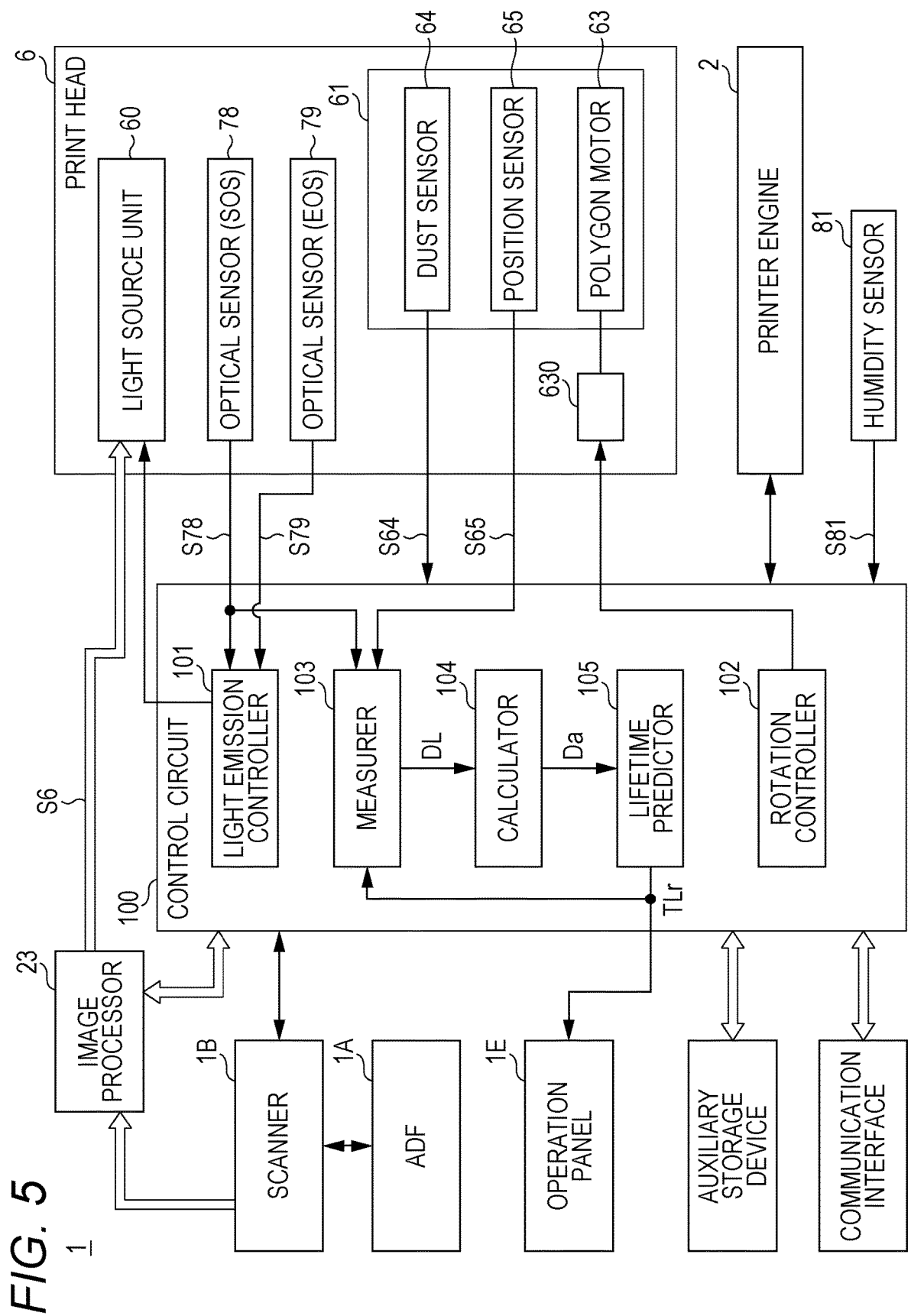
FIG. 5 is a diagram illustrating a first example of a functional configuration of a control circuit.
Figure 6A:
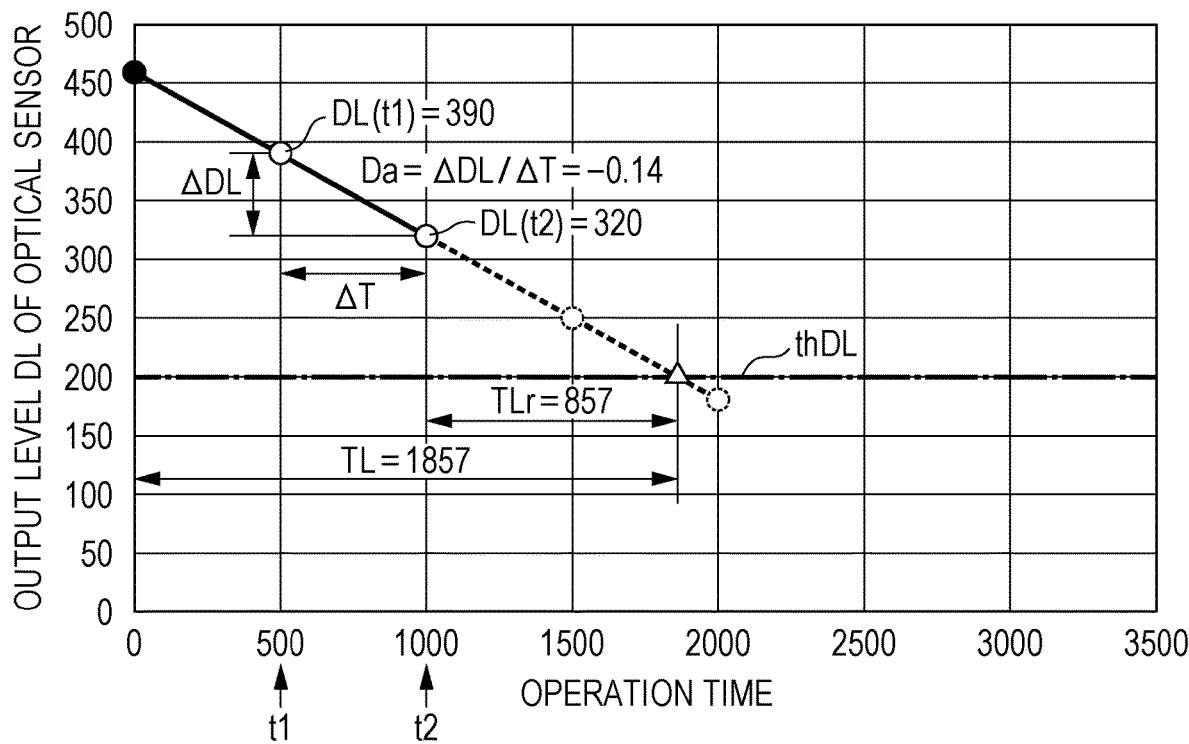
FIGS. 6A and 6B are diagrams illustrating a first example of a method of calculating a remaining life of the polygon mirror.
Figure 6B:
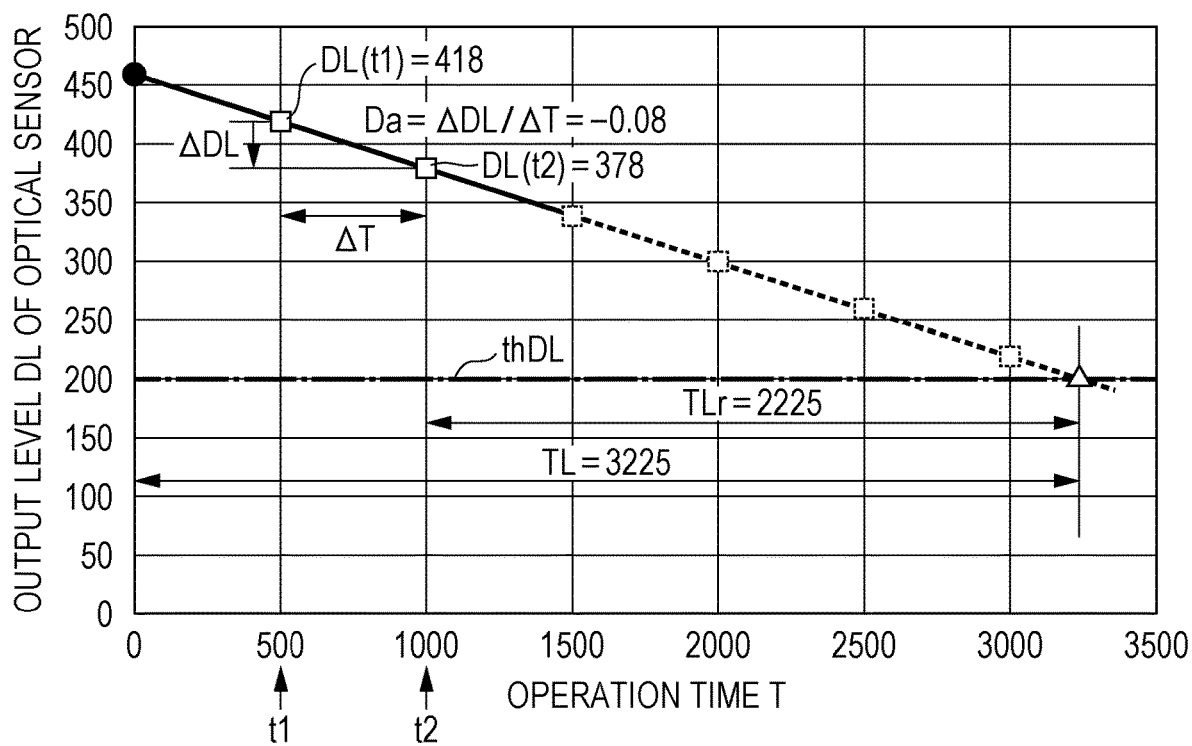

FIG. 5 illustrates a first example of a functional configuration of the control circuit 100, and FIGS. 6A and 6B illustrate a first example of a method of calculating a remaining life DLr of the polygon mirror 62.

In FIG. 5, the control circuit 100 receives a job input by a user operation using the operation panel 1E or network communication and controls execution of the job. For example, in a copy job, the control circuit 100 causes the printer engine 2 and the print head 6 to prepare for image formation, and controls the scanner 1B and an image processor unit 23 to give a print data signal S6 to the light source unit 60 of the print head 6. The print data signal S6 is a signal that is a base of laser emission control for pattern exposure in forming a latent image.

Detection signals S64, S65, and S81 from the dust sensor 64, the position sensor 65, and a humidity sensor 81 are input to the control circuit 100. The humidity sensor 81 is arranged inside the image forming apparatus 1.

The control circuit 100 includes a light emission controller 101, a rotation controller 102, a measurer 103, a calculator 104, a lifetime predictor 105, and the like. These functions are realized by a hardware configuration of the control circuit 100 including a central processing unit (CPU) and by a control program being executed by the CPU.

The light emission controller 101 uses light detection signals S78 and S79 from the optical sensors 78 and 79 as the SOS signals or the EOS signals, and controls the light source unit 60 to modulate (intermittent) the laser beam LB according to the print data signal S6.

The rotation controller 102 gives a command for rotating the polygon motor 63 at a predetermined speed to a drive circuit 630 of the polygon motor 63.

The measurer 103 periodically measures and stores an output level DL of the optical sensor 78. The measurer 103 measures a peak value or a pulse width of the light detection signal S78 from the optical sensor 78, that is, a light amount level of the laser beam LB entering the optical sensor 78, as the output level DL of the optical sensor 78. However, there are the following modifications. In a case where the light emission controller 101 detects the light amount level of the laser beam LB entering the optical sensor 78 on the basis of the light detection signal S78 and controls power to be supplied to the light source to keep the light amount level constant, the measurer 103 measures a supply level of the power as the output level.

By the way, in the polygon mirror 62, the degree of dirt between the mirror surfaces 620 sometimes becomes uneven due to eccentricity of a rotation axis and variation in surface tilt of the mirror surface 620. Therefore, the lifetime is favorably predicted on the basis of the greatest state of progress of dirt in states of progress of dirt of the six mirror surfaces 620.

Therefore, the measurer 103 detects which laser beam LB reflected by which mirror surface 620 the light detection signal S78 output six times during one rotation of the polygon mirror 62 corresponds to, according to the position detection signal S65 from the position sensor 65. Details are as follows.

The position sensor 65 issues the position detection signal S65 at the timing when deflection by one mirror surface 620 previously set as a reference surface starts. For example, a magnet is provided at the rotation angle position corresponding to the reference surface of a shaft of the polygon motor 63, and a Hall element sensitive to the magnet can be arranged near the shaft to form the position sensor 65. Alternatively, a mark is attached to the shaft, and a reflective photosensor that detects this mark can be used as the position sensor 65.

When the measurer 103 detects the position detection signal S65, the measurer 103 counts the light detection signal S78 issued after the detection. By repetition of counting from 1 to 6, count values uniquely correspond to the mirror surfaces 620. For example, assuming that a mirror surface 620*a* is the reference surface, the count value "1" corresponds to the mirror surface 620*a* and the count values "2" to "6" correspond to the mirror surfaces 620*b* to 620*f*.

The measurer 103 stores measurement values (light amount levels DL) of the light detection signals S78 in association with the six count values, respectively. In measurement, the polygon mirror 62 rotates at least n times (n is an integer of 2 or more), and the light detection signal S78 is sampled n times for each of the mirror surfaces 620*a* to 620*f*. Then, an average value of the obtained n measurement results is stored as the measurement value.

Such a measuring operation by the measurer 103 is repeated at predetermined time intervals. Specifically, measurement is performed every time the operation time (rotated time) of the polygon mirror 62 becomes a predetermined value. For example, measurement is performed every time the operation time from a new state increases by 500 hours, and as will be described below, after a remaining life Tr calculated by the lifetime predictor 105 becomes shorter than 500 hours, measurement is performed when the operation time increases by a time shorter than (for example, half of) the calculated remaining life Tr.

When the output level DL of the optical sensor 78 is measured by the measurer 103, the calculator 104 calculates a rate of change over time Da on the basis of the measurement value (output level DL) obtained in this measurement, the measurement value obtained and stored in previous measurement, and an operation time ΔT from the previous measurement. The rate of change over time Da is a change amount of the output level DL per unit operation time of the polygon mirror 62. The unit operation time can be arbitrarily determined, and can be, for example, one hour.

Calculation of the rate of change over time Da is performed for each of the six mirror surfaces 620. That is, the calculator 104 repeats calculation to be described below to calculate six rates of change over time Da.

In FIGS. 6A and 6B, at time t2 when the operation time is 1000 hours, the rate of change over time Da is calculated using the output level DL (t2) at the time t2 and the output level DL (t1) at time t1 when the operation time was 500 hours. The rate of change over time Da calculated in this case indicates the degree of change in the output level DL from the time t1 to the time t2 (dirty state).

Note that, in FIGS. 6A and 6B, the output level DL (t1) and the output level DL (t2) are the measurement values corresponding to the same mirror surface 620.

In FIG. 6A, the output level DL (t1) at the time t1 is 390 and the output level DL (t2) at the time t2 is 320. Further, the operation time ΔT from the time t1 to the time t2 is 500.

The rate of change over time Da is expressed by the following equation (1).

$$Da = \Delta DL/\Delta T \quad (1)$$

where $\Delta DL = DL(t2) - DL(t1)$

The calculator 104 performs calculation of the equation (1). In the case of FIG. 6A, the rate of change over time Da is calculated to be −0.14.

In FIG. 6B, the output level DL (t1) at the time t1 is 418 and the output level DL (t2) at the time t2 is 378, and the operation time ΔT from the time t1 to the time t2 is 500. In the case of FIG. 6B, the rate of change over time Da is calculated to be −0.08.

Returning to FIG. 5, the calculator 104 notifies the lifetime predictor 105 of the rates of change over time Da calculated for the respective six mirror surfaces 620.

When the output level DL is measured by the measurer 103 and the rate of change over time Da is calculated by the calculator 104, the lifetime predictor 105 calculates a remaining life TLr of the polygon mirror 62.

Specifically, the lifetime predictor 105 calculates, as the remaining life TLr, an operation time T of the polygon mirror 62 to when the output level DL becomes a threshold value thDL in a case of assuming that the output level DL ongoingly changes at the calculated rate of change over time Da. The threshold value thDL is a limit value of the output level DL, which is set to determine that the lifetime of the polygon mirror 62 has ended.

In FIGS. 6A and 6B, at the time t2, the remaining life TLr at this time t2 is calculated. The threshold value thDL is set to 200.

The remaining life TLr is expressed by the following equation (2).

$$TLr = [thDL - DL(t2)]/Da \quad (2)$$

In the case of FIG. 6A, since the output level DL (t2) is 320 and the rate of change over time Da is −0.14, the remaining life TLr is calculated to be 857. As a result, at the time t2 when the operation time T is 1000 hours, a lifetime TL of the polygon mirror 62 is predicted to be 1857 hours.

In the case of FIG. 6B, since the output level DL (t2) is 378 and the rate of change over time Da is −0.08, the remaining life TLr is calculated to be 2225. The lifetime TL is predicted to be 3225 hours.

The lifetime predictor 105 calculates the remaining lives TLr for the six mirror surfaces 620, and extracts the shortest remaining life TLr in the obtained six remaining lives TLr. Then, in a case where the shortest remaining life TLr is a set value (Tmin) or less, a message prompting the user to replace the polygon mirror 62 is displayed on a display of the operation panel 1E. A maintenance request may be transmitted to a service center in place of or in addition to the display.

The set value (Tmin) is determined to secure the number of days of about two weeks to one month that is required for replacement by the end of the lifetime TL. For example, use experience of the image forming apparatus 1 by the user is recorded, and the set value (Tmin) is determined from an average operation time per day. For example, in a case where the average operation time is 2 hours and the number of days to be secured is 30 days, the set value (Tmin) is set to 60 hours.

In a case where the shortest remaining life TLr is longer than the set value (Tmin), the lifetime predictor 105 notifies the measurer 103 of the remaining life TLr without performing processing of displaying the message to the user.

When the measurer 103 receives the notification of the remaining life TLr, the measurer 103 sets a period of the next measurement as follows.

In a case where the remaining life TLr is longer than an initial measurement interval (ΔT), the measurer 103 maintains the initial measurement interval (ΔT) as a measurement interval up to the next measurement.

In contrast, in a case where the remaining life TLr is shorter than the initial measurement interval (ΔT), the measurer 103 sets a time obtained by subtracting the set value (Tmin) from the remaining life TLr or a shorter time than the time as the measurement interval up to the next measurement. At this time, since there is a possibility that the average operation time per day increases by the next measurement, and the set value (Tmin) at the time of next measurement becomes larger than that of the present time, the measurement interval can be made short in order to reliably prevent missing of replacement.

Figure 7:
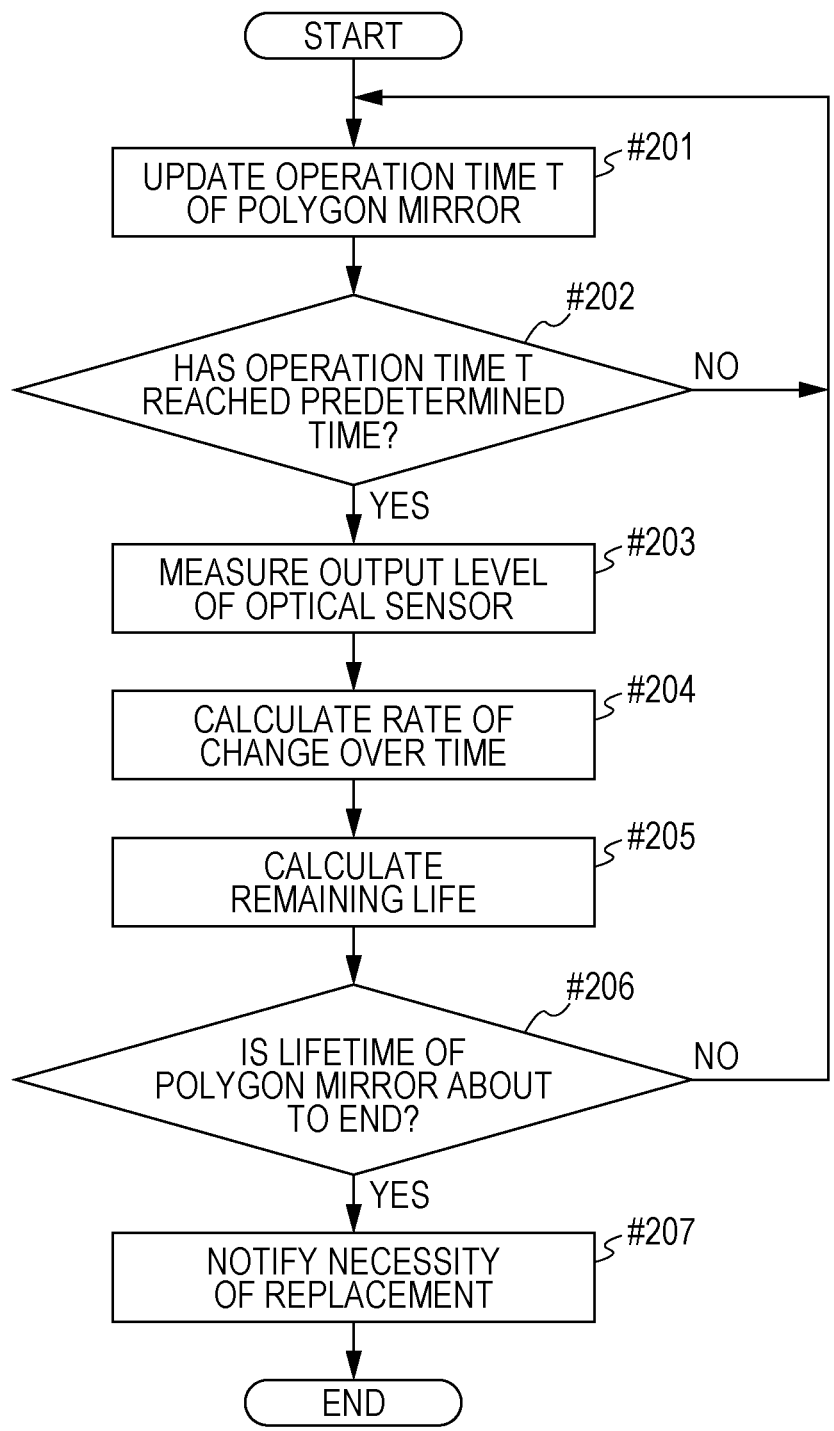
FIG. 7 is a diagram illustrating a first example of a flow of processing in the image forming apparatus.

FIG. 7 illustrates a first example of a flow of processing in the image forming apparatus 1.

The rotation time of the polygon motor 63 is detected as the operation time T of the polygon mirror 62 by monitoring on/off control for the polygon motor 63, and the operation time T is updated every rotation of the polygon motor 63 (#201).

When the operation time T increases to a set time (YES in #202), the output level DL of the optical sensor 78 is measured (#203), the rate of change over time Da is calculated (#204), and the remaining life DLr of the polygon mirror 62 DLr is calculated (#205). Then, whether the lifetime TL of the polygon mirror 62 is about to end is determined on the basis of the remaining life TLr (#206).

In a case where the lifetime TL is determined to be about to end (YES in #206), necessity of replacement of the polygon mirror 62 is notified to the user or the service center (#207). In a case where the lifetime TL is determined to be about not to end (NO in #206), the processing is returned to step #201 and the processing of steps #201 to #206 is repeated.

[Second Mode of Lifetime Prediction]

In the present second mode, measurement of the output level DL is performed in a period determined by a dust amount detected by the dust sensor 64, not in the period determined by the operation time T of the polygon mirror 62, like the above-described first mode.

The dust sensor 64 is, for example, a light scattering sensor, and includes a light source that illuminates an internal space and an optical detector that detects a scattered light amount due to dust. A heater that generates an upward air current may be incorporated in the internal space. Another type of sensor such as a light absorption sensor or a piezoelectric balance sensor may be used.

Figure 8:
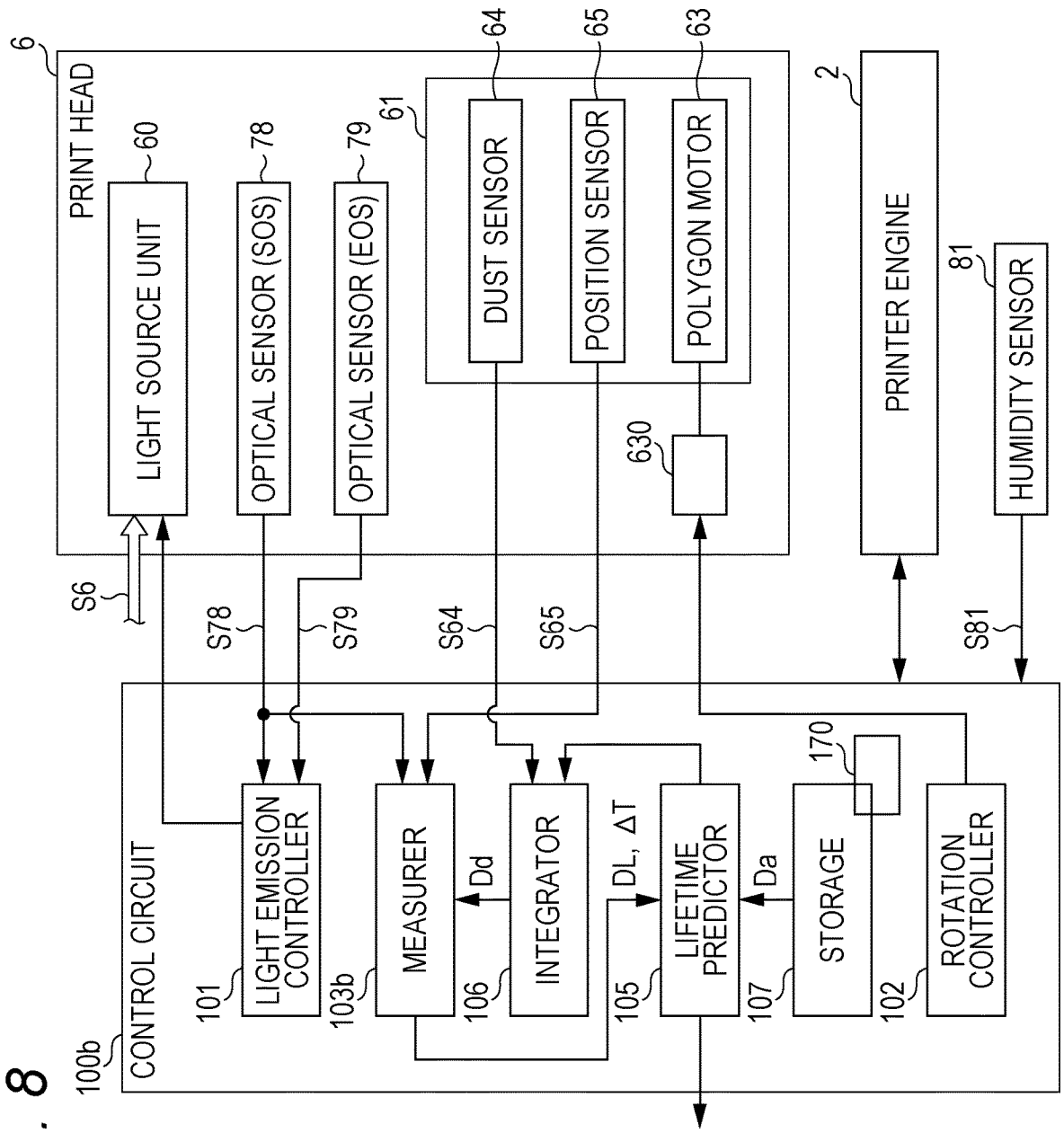
FIG. 8 is a diagram illustrating a second example of the functional configuration of the control circuit.
Figure 9:
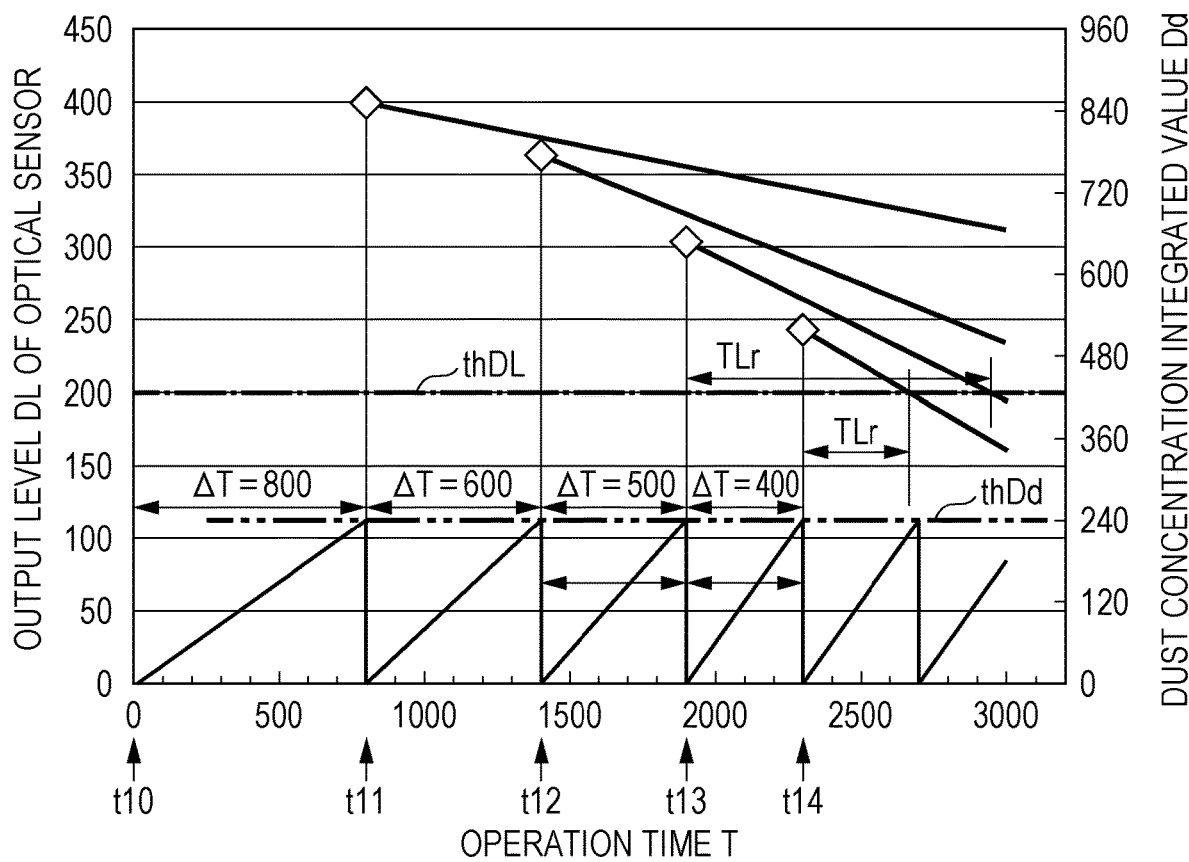
FIG. 9 is a diagram illustrating a second example of a method of calculating a remaining life of the polygon mirror.
Figures 10A, 10B:
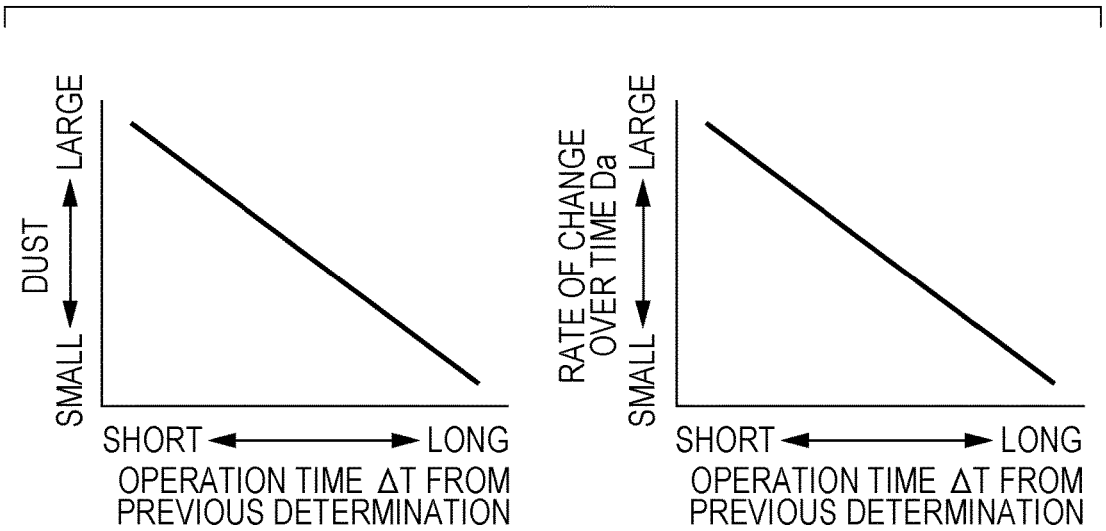
FIGS. 10A and 10B are diagrams illustrating an example of a rate of change setting table.
Figure 11:
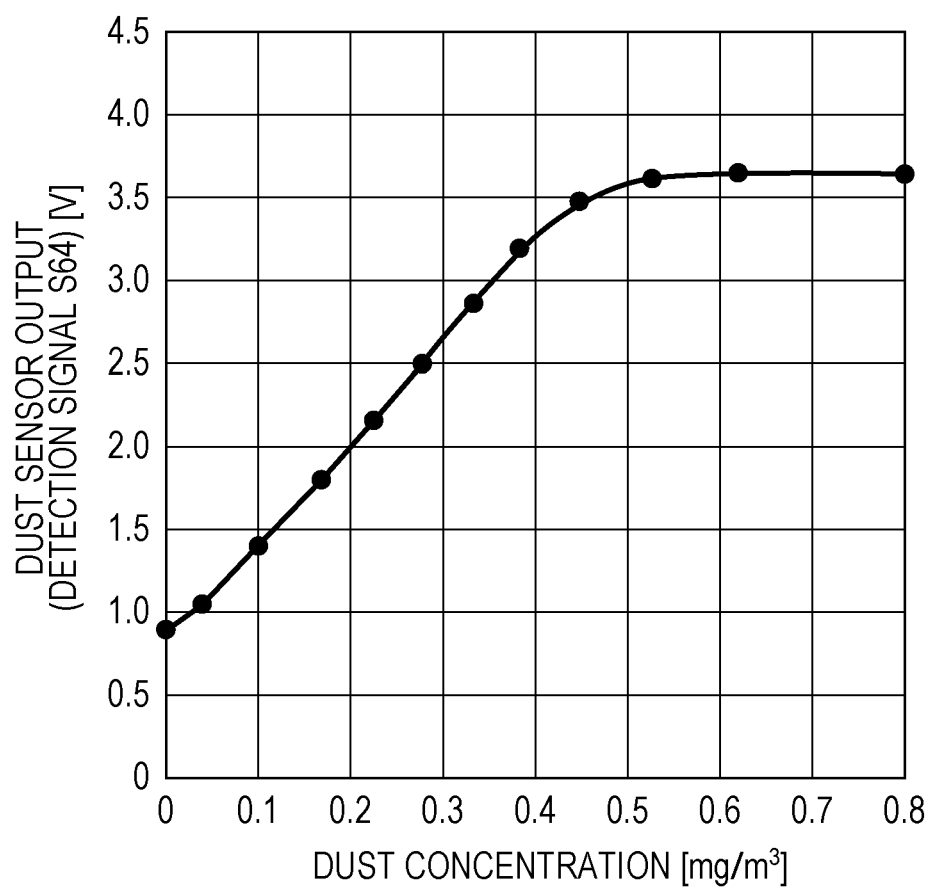
FIG. 11 is a diagram illustrating an example of a detection characteristic of a dust sensor.

FIG. 8 illustrates a second example of the functional configuration of the control circuit 100, FIG. 9 illustrates a second example of the method of calculating the remaining life DLr of the polygon mirror 62, FIGS. 10A and 10B illustrate an example of a rate of change setting table 170, and FIG. 11 illustrates an example of a detection characteristic of the dust sensor 64, respectively.

In FIG. 8, elements having similar functions to those in FIG. 5 are denoted by the same reference numerals as in FIG. 5, and description of the elements is omitted or simplified.

A control circuit 100b illustrated in FIG. 8 includes a light emission controller 101, a rotation controller 102, a measurer 103b, a lifetime predictor 105b, an integrator 106, a storage 107, and the like. These functions are realized by a hardware configuration of the control circuit 100b and by a control program being executed by a processor.

Every time the dust concentration is detected by the dust sensor 64, the integrator 106 integrates the detected dust concentration indicated by the dust detection signal S64, and updates a dust concentration integrated value Dd indicating a result of the integration. Detection of the dust concentration by the dust sensor 64 is periodically performed while the polygon mirror 62 is rotating.

The measurer 103b measures the output level DL of the optical sensor 78 when the dust concentration integrated value Dd becomes a set value thDd or more. Then, the measurer 103b notifies the lifetime predictor 105b of the measured output level DL and the operation time ΔT to when the dust concentration integrated value Dd becomes the set value or more.

The storage 107 stores the rate of change setting table 170. As illustrated in FIG. 10B, the rate of change setting table 170 is information indicating the rates of change over time Da respectively associated with a plurality of times having different lengths from one another. Details are as follows.

Assuming that whether the remaining life DLr is sufficiently long is determined every time the dust concentration integrated value Dd becomes the set value thDd or more. In this case, as illustrated by the graph on the left in FIG. 10A, the amount of dust (dirt) is large when the time (ΔT) required to when the dust concentration integrated value Dd becomes the set value thDd or more from previous determination is short, and conversely, the amount of dust is small when the time (ΔT) is long.

In an environment with a large amount of dust, progress of the change over time (decrease in the output level DL) is relatively fast, and in an environment with a small amount of dust, progress of the change over time is relatively slow. That is, there is a correlation illustrated in the graph on the right in FIG. 10A between the operation time ΔT from the previous determination and the rate of change over time Da.

The rate of change setting table 170 is obtained by dividing an assumed range of the operation time ΔT into a plurality of small ranges at intervals of 100 hours and determining the rate of change over time Da for each small range on the basis of the correlation in FIG. 10A.

When the output level DL and the operation time ΔT are notified from the measurer 103b, the lifetime predictor 105b calculates the remaining life TLr by reference to the rate of change setting table 170. Specifically, the lifetime predictor 105b calculates the remaining life TLr by the above equation (2) using the rate of change over time Da associated with the notified operation time ΔT in the rate of change setting table 170.

In the example of FIG. 9, the set value thDd of the dust concentration integrated value Dd is set to 240, and the threshold value thDL of the output level DL of the optical sensor is set to 200, as in the example of FIGS. 6A and 6B.

At time t10 when the polygon mirror 62 is brand new, the dust concentration integrated value Dd is 0. The dust concentration integrated value Dd increases as the operation time T increases from the time t10.

At time t11 when the operation time T becomes 800, the dust concentration integrated value Dd becomes equal to the set value thDd, and thus the remaining life TLr is calculated. At this time, the operation time ΔT from the time t10 to the time t11 is 800. According to the rate of change setting table 170 in FIG. 10B, the rate of change over time Da of when the operation time ΔT is 800 is −0.04. Further, the output level DL at the time t11 is 400.

The lifetime predictor 105b calculates the remaining life TLr according to the following equation (2b).

$$TLr = [thDL - DL]/Da \qquad (2b)$$

The remaining life TLr at the time t11 is 5000 hours, and the lifetime is estimated to be 5800 hours.

The calculated remaining life TLr is compared with the set value (Tmin) serving as the reference of replacement necessity determination of the polygon mirror 62, similarly to the example of FIGS. 6A and 6B. That is, necessity of replacement is determined. Since the remaining life TLr at the time t11 is longer than the set value (Tmin), replacement being unnecessary is determined. In this case, notification to the user is not performed. When the determination is performed in this manner, the integrator 106 resets the dust concentration integrated value Dd.

The dust concentration integrated value Dd, which has been reset and becomes 0, increases as the operation time T increases from the time t11. At time t12 when the operation time T becomes 1400, the dust concentration integrated value Dd becomes equal to the set value thDd, and thus the remaining life TLr is calculated. At this time, the operation time ΔT from the time t11 to the time t12 is 600, and the output level DL at the time t12 is 364. According to the rate of change setting table 170, the rate of change over time Da of when the operation time ΔT is 600 is −0.08.

The remaining life TLr is calculated by the equation (2b) similarly to the time t11, and necessity of replacement is determined. The dust concentration integrated value Dd is reset. The remaining life TLr at the time t12 is 2050 hours, and the lifetime is estimated to be 3450 hours.

At time t13 when the operation time T becomes 1900, the dust concentration integrated value Dd becomes equal to the set value thDd, and thus the remaining life TLr is calculated. At this time, the operation time ΔT from the time t12 to the time t13 is 500, and the output level DL at the time t13 is 304. The rate of change over time Da of when the operation time ΔT is 500 is −0.10.

The remaining life TLr is calculated by the equation (2b) similarly to the time t12, and necessity of replacement is determined. The dust concentration integrated value Dd is reset. The remaining life TLr at the time t13 is 1040 hours, and the lifetime is estimated to be 2940 hours.

At time t14 when the operation time T becomes 2300, the dust concentration integrated value Dd becomes equal to the set value thDd, and thus the remaining life TLr is calculated. At this time, the operation time ΔT from the time t13 to the time t14 is 400, and the output level DL at the time t14 is 244. The rate of change over time Da of when the operation time ΔT is 400 is −0.12. The remaining life TLr is calculated by the equation (2b) similarly to the time t13, and necessity of replacement is determined. The dust concentration integrated value Dd is reset. The remaining life TLr at the time t14 is 367 hours, and the lifetime is estimated to be 2667 hours.

Figure 12:
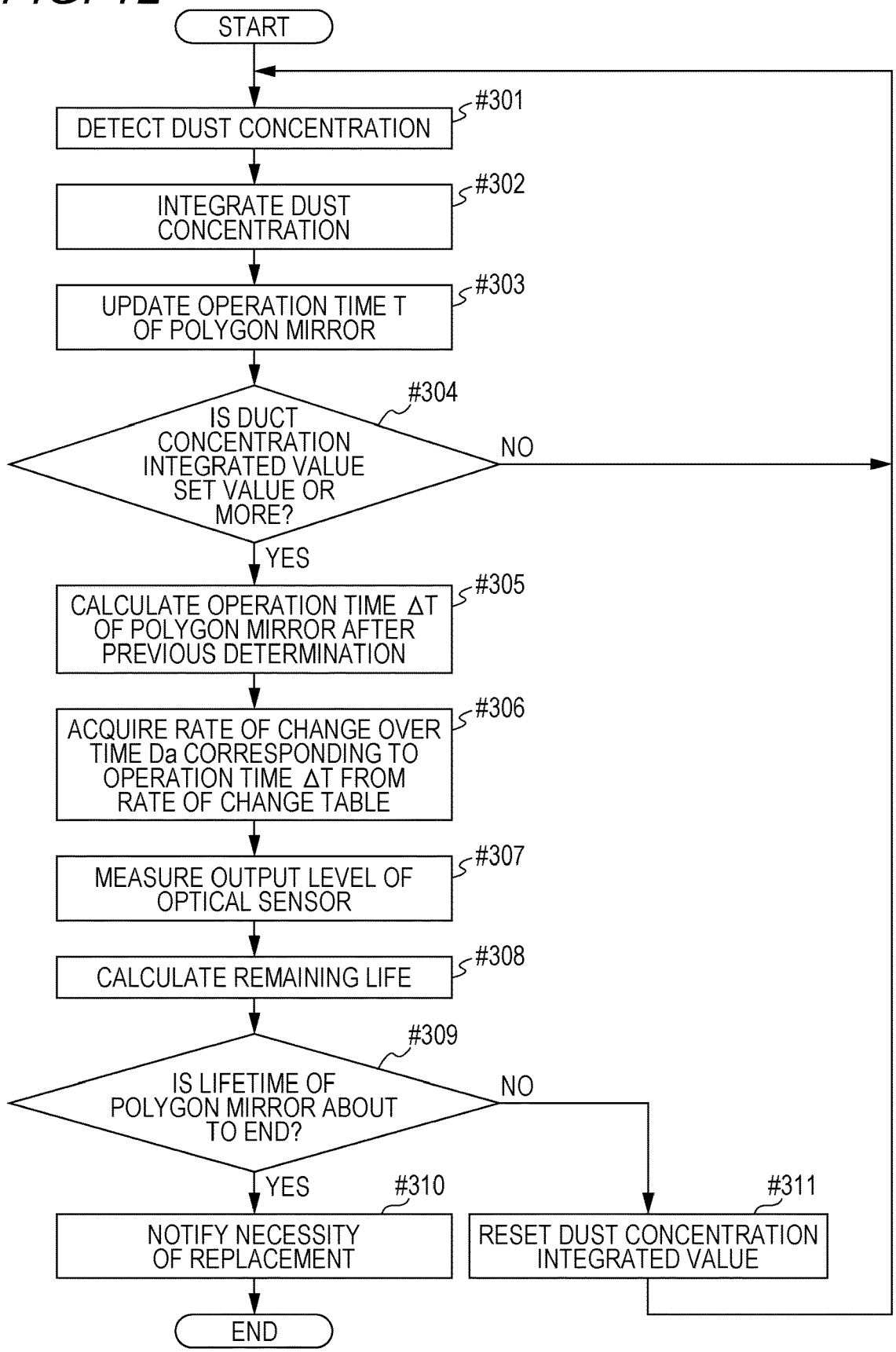
FIG. 12 is a diagram illustrating a second example of a flow of the processing in the image forming apparatus.

FIG. 12 illustrates a second example of a flow of the processing in the image forming apparatus 1.

The dust concentration is detected (#301), and the dust concentration integrated value Dd is updated (#302). The rotation time of the polygon motor 63 is detected as the operation time T of the polygon mirror 62, and the operation time T is updated every time the polygon motor 63 rotates (#303).

When the dust concentration integrated value Dd becomes the set value thDd or more (YES in #304), the operation time ΔT from previous determination is calculated (#305), and the rate of change over time Da corresponding to the operation time ΔT is acquired from the rate of change setting table 170 (#306).

The output level DL of the optical sensor 78 is measured (#307), and the remaining life TLr is calculated using the obtained rate of change over time Da (#308). Then, whether the lifetime TL of the polygon mirror 62 is about to end is determined on the basis of the remaining life TLr (#309).

In a case where the lifetime TL is determined to be about to end (YES in #309), necessity of replacement of the polygon mirror 62 is notified to the user or the service center (#310). In a case where the lifetime TL is determined to be about not to end (NO in #309), the dust concentration integrated value Dd is reset (#311) and then the processing is returned to step #301.

[Third Mode of Lifetime Prediction]

Figure 13:
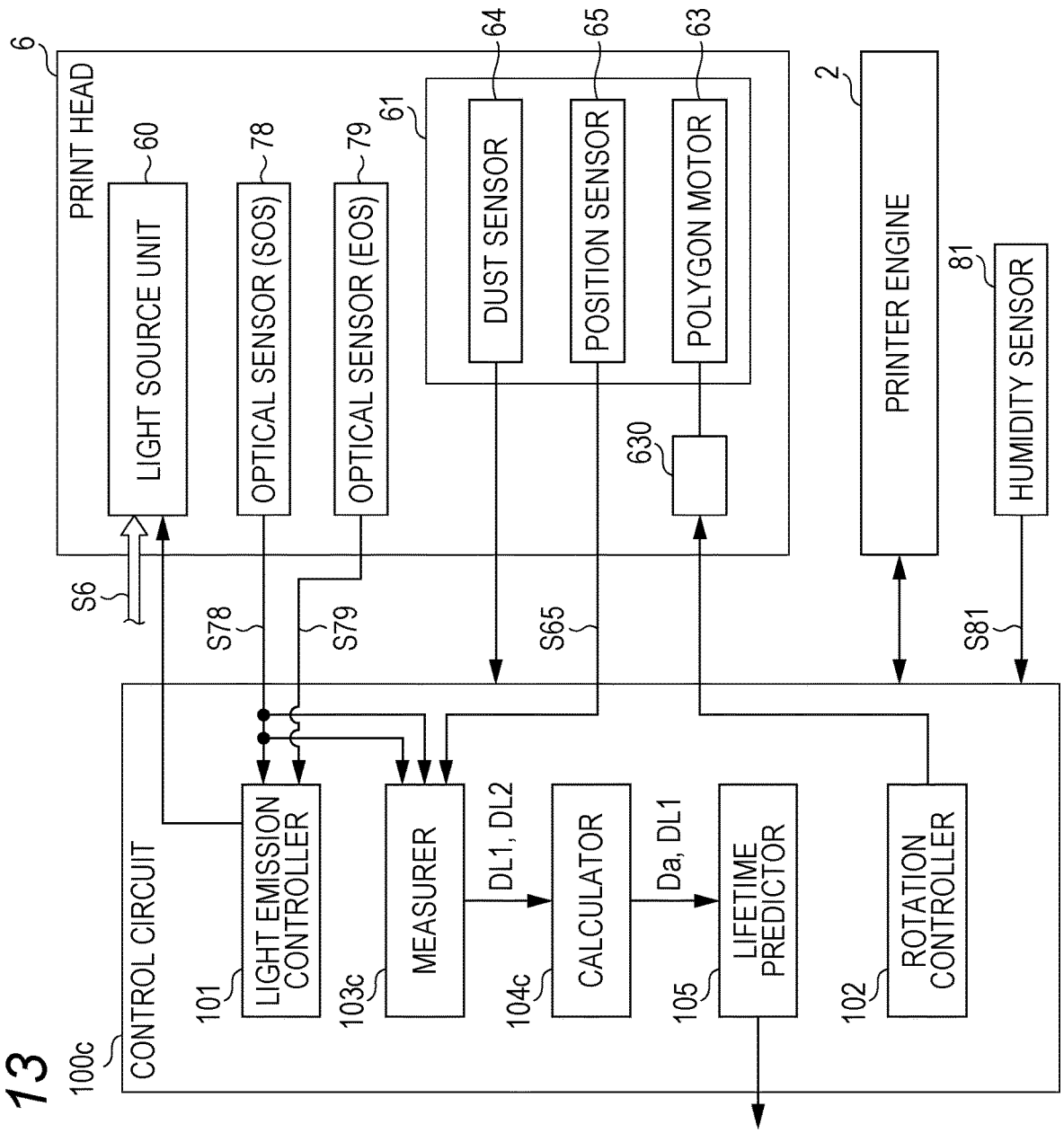
FIG. 13 is a diagram illustrating a third example of the functional configuration of the control circuit.

FIG. 13 illustrates a third example of the functional configuration of the control circuit 100. In FIG. 13, elements having similar functions to those in FIG. 5 are denoted by the same reference numerals as in FIG. 5, and description of the elements is omitted or simplified.

A control circuit 100c illustrated in FIG. 13 includes a light emission controller 101, a rotation controller 102, a measurer 103c, a calculator 104c, a lifetime predictor 105, and the like. These functions are realized by a hardware configuration of the control circuit 100c and by a control program being executed by a processor.

The measurer 103c periodically measures an upstream-side level DL1 that is the output level DL of the optical sensor 78, and a downstream-side level DL2 that is the output level DL of the optical sensor 79. Then, the measured upstream-side level DL1 and downstream-side level DL2 are notified to the calculator 104c.

The calculator 104c calculates a level difference DLd between the notified upstream-side level DL1 and downstream-side level DL2 and stores the level difference DLd together with the upstream-side level DLL Further, when the calculated level difference DLd is a threshold value thDLd or more, the calculator 104c calculates the rate of change over time Da of the upstream-side level DL1 on the basis of the latest upstream-side level DL1 corresponding to the level difference DLd, the upstream-side level DL1 previously measured and stored, and the operation time ΔT of the polygon mirror 62 from the previous measurement.

When the upstream-side level DL1 and the downstream-side level DL2 are measured by the measurer 103c and the rate of change over time Da is calculated by the calculator 104c, the lifetime predictor 105 calculates the remaining life TLr of the polygon mirror 62, similarly to the example in FIGS. 6A and 6B. Then, a message prompting the user to replace the polygon mirror 62 is displayed on the display of the operation panel 1E as needed.

Figure 14:
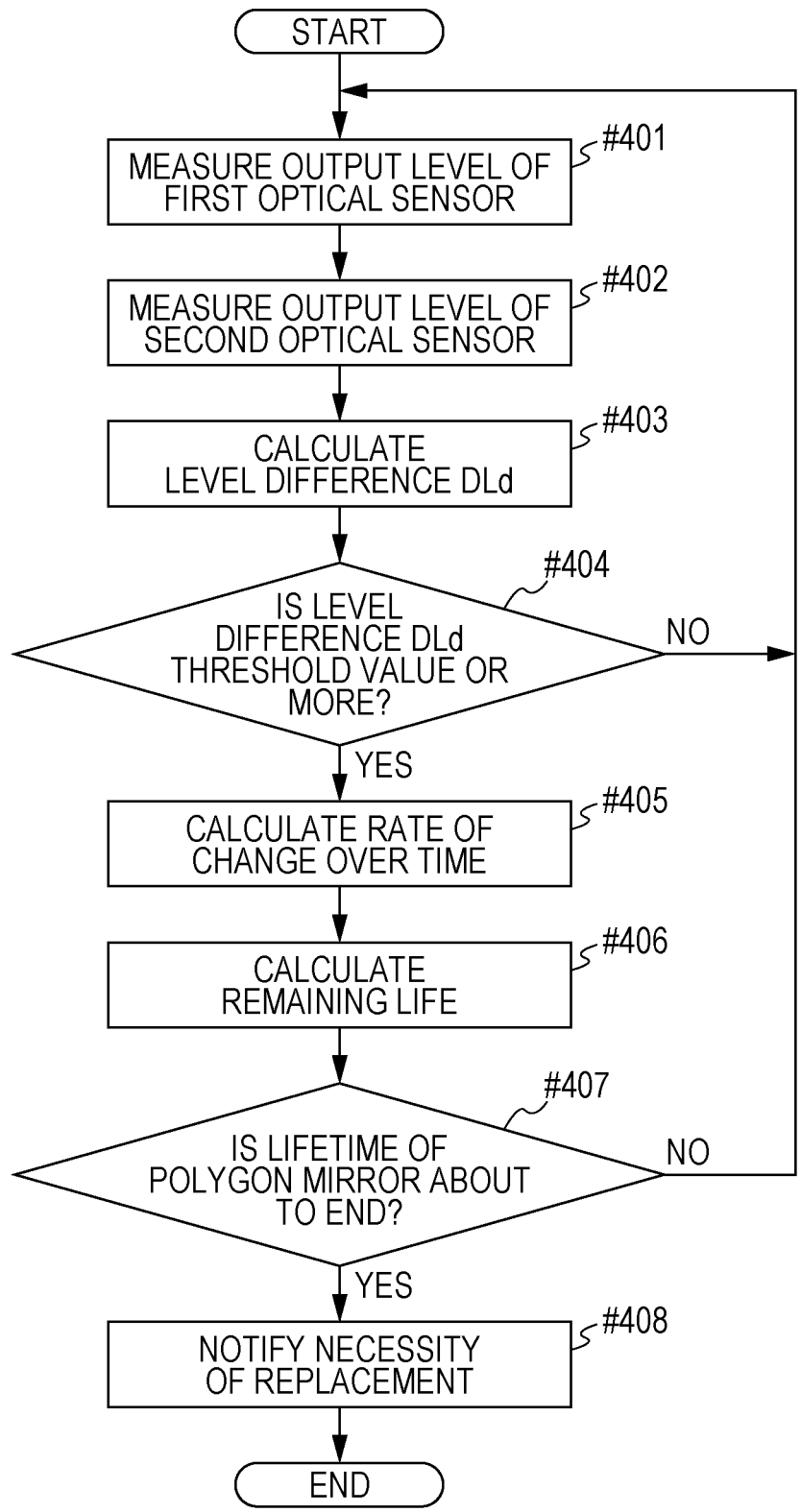
FIG. 14 is a diagram illustrating a third example of a flow of the processing in the image forming apparatus.

FIG. 14 illustrates a third example of a flow of the processing in the image forming apparatus 1.

The upstream-side level DL1 and the downstream-side level DL2 are measured (#401 and #402). The level difference DLd is calculated (#403).

When the level difference DLd is the threshold value thDLd or more (YES in #404), the rate of change over time Da is calculated (#405), and the remaining life TLr is calculated (#406). Then, whether the lifetime TL of the polygon mirror 62 is about to end is determined on the basis of the remaining life TLr (#407).

In a case where the lifetime TL is determined to be about to end (YES in #407), necessity of replacement of the polygon mirror 62 is notified to the user (#408). In a case where the lifetime TL is determined to be about not to end (NO in #407), the processing is returned to step #401 and the processing of steps #401 to #407 is repeated.

Figure 15A:
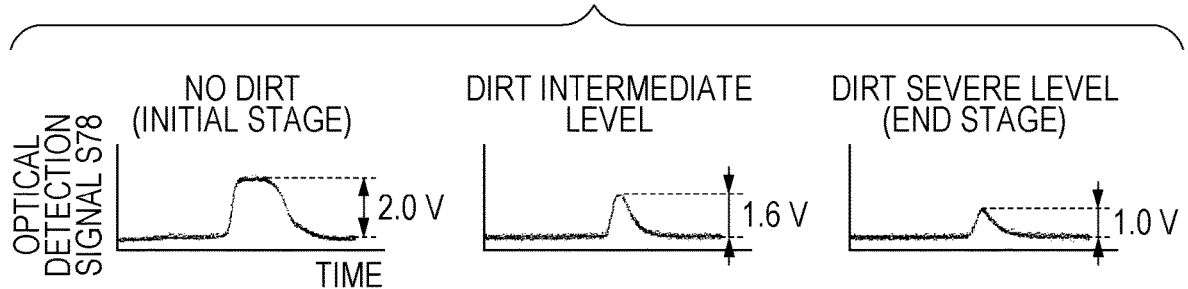
FIGS. 15A to 15C are diagrams illustrating examples of output levels of the optical sensor.
Figure 15B:
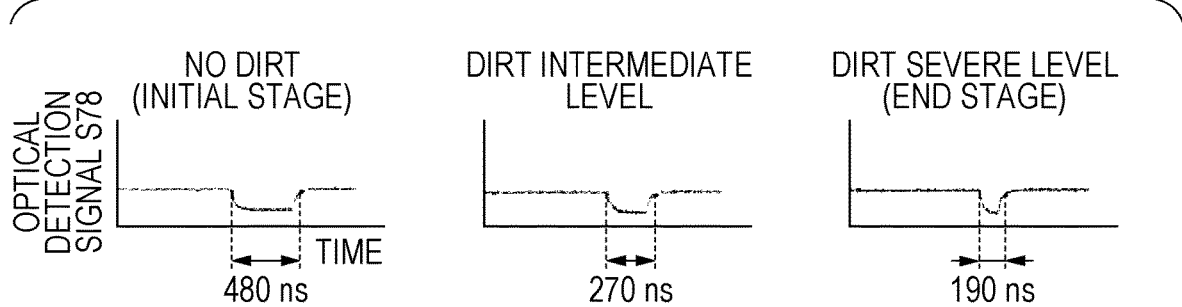
Figure 15C:
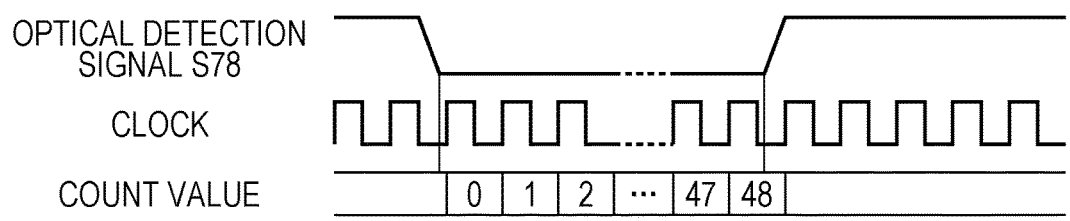

FIGS. 15A to 15C illustrate examples of the output level DL of the optical sensor 78.

As illustrated in FIG. 15A, the peak value of the light detection signal S78 decreases as the dirt of the polygon mirror 62 advances. The degree of dirt can be detected by measuring the peak value as the output level DL.

As illustrated in FIG. 15B, the pulse width of the light detection signal S78 becomes shorter as the dirt of the polygon mirror 62 advances. The pulse width can be measured by counting a clock as illustrated in FIG. 15C. The degree of dirt can be detected by measuring the pulse width as a pulse width output level DL.

Figure 16B:
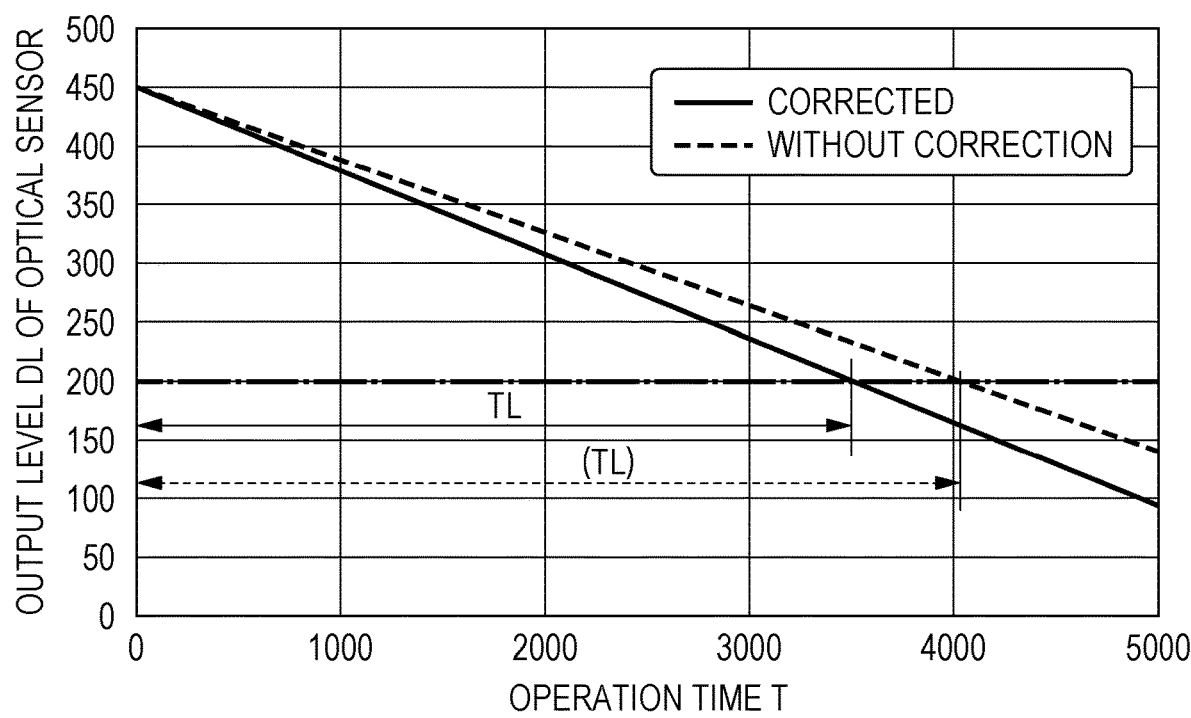

FIGS. 16A and 16B illustrate an example of a rate of change correction table 180 and an example of a relationship between presence or absence of correction and the remaining life TLr.

When a rotation speed V of the polygon mirror 62 differs, the state of generation of air current vortex related to adhesion of dust also differs. Even when the operation time T and the operation time ΔT are the same, the amount of dirt becomes larger as the rotation is faster. For this reason, it is favorable to perform correction according to the rotation speed of the polygon mirror 62 in calculating the rate of change over time Da.

The rate of change correction table 180 in FIG. 16A illustrates correction coefficients α corresponding to a plurality of rotation speeds V switched according to image forming modes. The correction coefficient α is a coefficient for calculating a corrected operation time ΔTa to be used in place of the operation time ΔT in the calculation according to the above equation (1). The corrected operation time ΔTa is expressed by the equation (3).

$$\Delta Ta = \alpha \times \Delta T \qquad (3)$$

For example, in a case where the correction coefficient α is smaller than 1, the corrected operation time ΔTa becomes longer than the operation time ΔT and an absolute value of the rate of change over time Da becomes large. Therefore, the predicted lifetime TL becomes shorter than the lifetime TL predicted when there is no correction, as illustrated in FIG. 16B.

According to the above embodiment, the remaining time to when the polygon mirror becomes out of use due to dirt can be predicted.

According to the configuration to measure the output level DL of the optical sensor 78 when the dust concentration integrated value Dd becomes the set value thDd or more, the number of times of measurement can be made smaller than a configuration to measure the output level DL every time the operation time T increases by a predetermined amount. The number of times of unnecessary calculation of the remaining life TLr becomes small in use in a clean environment, and the load of the processing by the control circuit 100 is decreased.

In the above-described embodiment, the processing of measuring the output level DL of the optical sensor 78 and calculating the remaining life TLr is performed in a period other than the printing period (during pattern exposure), whereby the load of the processing by the control circuit 100 can be decreased. For example, the processing is performed at the time of execution of post-processing of a print job, at the time of execution of image stabilization processing, at the time of warming up, at the time of standby for waiting for an input of a print job, or the like.

In the case of measuring the pulse width of the light detection signal S78 as the output level DL, the rotation speed V of the polygon mirror 62 is favorably set to be lower than the rotation speed V in the printing period. Since the pulse width is extended by lowering the rotation speed V, the resolution is increased. That is, the measurement accuracy can be improved without increasing a frequency of a counting clock. Further, even when the measurement accuracy is sufficiently high, the clock can be delayed by the extension of the pulse width, and the pulse width can be counted using a general-purpose peripheral (peripheral device) accompanying the CPU without providing a special circuit. That is, the cost of the control circuit 100 is not increased.

In the above-described embodiment, the operation time ΔT to the next calculation can be appropriately changed according to the magnitude of the rate of change over time Da used in the calculation of the remaining life TLr. The rate of change over time Da is small in an environment with a small amount of dust, and the rate of change over time Da is large in an environment with a large amount of dust. In the case of use in the environment with a small amount of dust, an unnecessary operation of the polygon motor 63 can be decreased by making an interval of calculation of the remaining life TLr long. Conversely, in the case of use in the environment with a large amount of dust, the degree of dirt is frequently confirmed by making the interval of calculation of the remaining life TLr short, and the lifetime TL can be more accurately predicted.

Since the amount of floating dust changes according to the humidity, the humidity detection signal S81 from the humidity sensor 81 is sampled at predetermined intervals (for example, every hour), and in a case where a low humidity state continues, the number of times of calculation of the remaining life TLr is increased, determining that the amount of floating dust is large. In a case where a high humidity state continues, the number of times of calculation of the remaining life TLr is decreased, determining that the amount of floating dust is small.

In the above-described embodiment, the example of calculating the rate of change over time Da, regarding the change of the output level DL as linear change, on the basis of the output levels DL(t1) and DL(t2) obtained in the previous and this measurements. However, the embodiment is not limited to the example. The change may be linearly approximated on the basis of three or more measurement values including a measurement value of the time before last, or the rate of change over time Da may be calculated estimating a function applied to change other than the linear change.

In the case of calculating the remaining life TLr when the level difference DLd between the upstream-side level DL1 and the downstream-side level DL2 is the threshold value thDLd or more, the change amount of the threshold value thDLd per unit operation time may be calculated as the rate of change over time Da.

The description has been given on the assumption that the output levels DL are measured for the plurality of respective mirror surfaces 620 of the polygon mirror 62. However, in a case where the plurality of mirror surfaces 620 gets uniformly dirty, the output level DL may be measured for any one of the plurality of mirror surfaces 620 without any distinction. The target mirror surface 620 may differ for each measurement, and the position sensor 65 can be omitted.

In addition, the configuration of the whole or each part of the image forming apparatus 1, the contents, order, or timing of the processing, the threshold value thDL, the set value thDd, and the like can be appropriately changed in accordance with the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus including a polygon mirror that deflects a light beam, the image forming apparatus comprising:
    an optical sensor arranged such that the light beam deflected by the polygon mirror enters the optical sensor;
    a dust sensor that detects a dust concentration of an inside of the image forming apparatus; and
    a hardware processor that measures an output level of the optical sensor and calculates, as a remaining life of the polygon mirror, an operation time of the polygon mirror to when the output level becomes a threshold value in a case of assuming that the output level ongoingly changes at a rate of change over time that is a change amount of the output level per unit operation time of the polygon mirror, using the measured output level, wherein
    the hardware processor integrates the detected dust concentration every time the dust concentration is detected to update a dust concentration integrated value indicating a result of the integration, and
    the hardware processor measures the output level of the optical sensor when the dust concentration integrated value becomes a set value or more.

2. The image forming apparatus according to claim 1, wherein
    the hardware processor periodically measures and stores the output level,
    the hardware processor calculates the rate of change over time on the basis of the output level measured when the output level has been measured, the previously measured and stored output level, and the operation time of the polygon mirror from the previous measurement, and
    the hardware processor calculates the remaining life, using the rate of change over time calculated by the hardware processor.

3. The image forming apparatus according to claim 2, wherein
    the hardware processor measures the output level at a shorter time interval as the rate of change over time calculated using the measured output level is larger.

4. The image forming apparatus according to claim 2, further comprising:
    a humidity sensor that detects humidity of the inside of the image forming apparatus, wherein
    the hardware processor measures the output level at a shorter time interval as the detected humidity is higher.

5. The image forming apparatus according to claim 1, wherein the hardware processor that stores information indicating the rate of change over time associated with each of a plurality of times having different lengths from one another, and the hardware processor calculates the remaining life, using the rate of change over time associated with the operation time of the polygon mirror to when the dust concentration integrated value becomes the set value or more in the information.

6. The image forming apparatus according to claim 1, further comprising:

a first optical sensor arranged such that the light beam having passed through an upstream-side part in a deflecting direction of an optical path of the deflected light beam enters the first optical sensor, and a second optical sensor arranged such that the light beam having passed through a downstream-side part in the deflecting direction of the optical path of the deflected light beam enters the second optical sensor, as the optical sensors, wherein the hardware processor measures an upstream-side level that is the output level of the first optical sensor and a downstream-side level that is the output level of the second optical sensor, as the output levels, and the hardware processor calculates the remaining life, using the change amount per unit operation time of the upstream-side level, as the rate of change over time, in a case where the upstream-side level and the downstream-side level have been measured and a difference between the upstream-side level and the downstream-side level is a set value or more.

7. The image forming apparatus according to claim 1, wherein the hardware processor controls power to be supplied to a light source of the light beam so as to keep a light amount level of the light beam to enter the optical sensor constant, and the hardware processor measures a supply level of the power, as the output level.

8. The image forming apparatus according to claim 1, wherein the optical sensor is a sensor arranged on an upstream side in a deflecting direction in an optical path of the light beam so as to synchronize main scanning by the light beam.

9. The image forming apparatus according to claim 1, wherein the hardware processor measures a peak value or a pulse width of a detection signal output from the optical sensor, as the output level.

10. The image forming apparatus according to claim 1, further comprising:

a position sensor that detects a rotation angle position of the polygon mirror, wherein the hardware processor identifies a plurality of mirror surfaces in the polygon mirror on the basis of the detected rotation angle position, and measures the output level of when the light beam reflected at each of the mirror surfaces enters the optical sensor, and the hardware processor calculates the remaining life on the basis of the output level having largest change in the output levels respectively corresponding to the plurality of mirror surfaces.

11. The image forming apparatus according to claim 10, wherein the hardware processor measures the output levels respectively corresponding to the plurality of mirror surfaces in a case where an eccentricity amount or a surface tilt amount of a rotation axis of the polygon mirror is an upper limit value or more, and in a case where both the eccentricity amount and the surface tilt amount are less than the upper limit values, the hardware processor measures the output level corresponding to any one of the plurality of mirror surfaces.

12. The image forming apparatus according to claim 1, wherein the hardware processor performs correction of making the rate of change over time larger in a case where a rotation number of the polygon mirror is large than a case where the rotation number of the polygon mirror is small, and calculates the remaining life using the rate of change over time after the correction.

13. The image forming apparatus according to claim 1, wherein a measurement period in which the light beam is deflected is provided separately from a printing period in which the light beam is deflected to form an image, the hardware processor controls a drive source of the polygon mirror such that the polygon mirror rotates at a slower speed than a speed in the printing period, the hardware processor measures the output level in the measurement period, and the hardware processor calculates the remaining life in the measurement period.

\* \* \* \* \*